United States Patent
Vurma et al.

(10) Patent No.: US 9,844,227 B2
(45) Date of Patent: Dec. 19, 2017

(54) STABILIZED NUTRITIONAL COMPOSITIONS INCLUDING STARCH

(71) Applicant: ABBOTT LABORATORIES, Abbott Park, IL (US)

(72) Inventors: Mustafa Vurma, Dublin, OH (US); Gul Konuklar, New Albany, OH (US)

(73) Assignee: ABBOTT LABORATORIES, Abbott Park, IL (US)

( * ) Notice: Subject to any disclaimer, the term of this patent is extended or adjusted under 35 U.S.C. 154(b) by 304 days.

(21) Appl. No.: 14/362,532

(22) PCT Filed: Dec. 3, 2012

(86) PCT No.: PCT/US2012/067555
§ 371 (c)(1),
(2) Date: Jun. 3, 2014

(87) PCT Pub. No.: WO2013/101400
PCT Pub. Date: Jul. 4, 2013

(65) Prior Publication Data
US 2014/0335258 A1 Nov. 13, 2014

Related U.S. Application Data

(60) Provisional application No. 61/581,640, filed on Dec. 30, 2011, provisional application No. 61/581,642, filed on Dec. 30, 2011.

(51) Int. Cl.
*A23L 29/212* (2016.01)
*A23L 2/52* (2006.01)
(Continued)

(52) U.S. Cl.
CPC ............... *A23L 29/212* (2016.08); *A23L 2/52* (2013.01); *A23L 29/10* (2016.08); *A23L 29/30* (2016.08);
(Continued)

(58) Field of Classification Search
CPC .......... A23L 1/296; A23L 29/10; A23L 29/30; A23L 29/212; A23L 33/40
See application file for complete search history.

(56) References Cited

U.S. PATENT DOCUMENTS

| 3,950,547 | A | 4/1976 | Lamar, III et al. |
| 6,077,558 | A | 6/2000 | Euber |
| 6,099,871 | A * | 8/2000 | Martinez ................ A23L 33/19 |
| | | | 426/2 |

FOREIGN PATENT DOCUMENTS

| DE | 2457733 A1 | 6/1976 |
| EP | 0189161 | 7/1986 |

(Continued)

OTHER PUBLICATIONS

First Office Action in CN Application No. 201280064889.9 dated Sep. 9, 2015.
(Continued)

*Primary Examiner* — Elizabeth Gwartney
(74) *Attorney, Agent, or Firm* — Calfee, Halter & Griswold LLP

(57) ABSTRACT

Disclosed are stabilized nutritional compositions having a stabilizer system including starch, or a combination of starch and maltotriose, and methods for manufacturing the compositions. The retrogradation effect commonly seen with starch stabilizers is substantially reduced or even eliminated in the disclosed nutritional compositions.

8 Claims, 12 Drawing Sheets

(51) Int. Cl.
    A23L 29/10      (2016.01)
    A23L 29/30      (2016.01)
    A23L 33/00      (2016.01)
    A23L 33/10      (2016.01)
(52) U.S. Cl.
    CPC ............... *A23L 33/10* (2016.08); *A23L 33/40* (2016.08); *A23V 2002/00* (2013.01)

(56) References Cited

FOREIGN PATENT DOCUMENTS

| EP | 2227966 A1 | 9/2010 |
|---|---|---|
| GB | 1493317 A | 11/1977 |
| WO | 00/60953 A2 | 10/2000 |
| WO | 2007/054207 A1 | 5/2007 |
| WO | 2008/006849 A1 | 1/2008 |
| WO | 2009/077457 A1 | 6/2009 |
| WO | 2009079002 | 6/2009 |

OTHER PUBLICATIONS

Second Office Action in CN Application No. 201280064889.9 dated May 12, 2016.
Final Examination Report in SG Application No. 11201403642 dated Feb. 22, 2016.
Zhang, Le-xing et al., The Physicochemical Properties and Application of Waxy Potato Starch Food Research and Development (2006) vol. 27, Issue 9 pp. 80-82 (Concise Statement Attached).
International Search Report and Written Opinion for PCT/US2012/067555 dated Apr. 12, 2013.
International Preliminary Report on Patentability for PCT/US2012/067555 dated Jul. 1, 2014.
Lamar, et al. "Factors influencing the emulsion stability of liquid diets," Journal of Food Science, vol. 41, No. 5, 1976, pp. 1168-1171.
Communication Pursuant to Rules 161(1) and 162 EPC in EP App. 12799468.9 dated Aug. 20, 2014.
First Office Action in Vietnam Patent Application No. 1-2014-02418 dated Nov. 20, 2014.
First Examination Report in New Zealand Patent Application No. 625992 dated Feb. 25, 2015.
Database Derwent World Patents Index [Online], Nov. 2011 (Nov. 2011), Kojima et al.: Database Accession No. 2011-B28034; & JP 2011 019436 A (Ina Shokuhin Kogyo KK); Feb. 3, 2011 (Feb. 3, 2011).
Database Caplus [Online], Chemical Abstracts Service, Columbus, Ohio, US; Emulsifying Artificial Liquid Food; Retrieved from STN, Database Accession No. 1974:26077; & JP 48 007347 B (Takasago Perfumery Co.) Jul. 30, 1970 (Jul. 30, 1970).
Office Action in CA Patent Application No. 2,859,016 dated May 4, 2015.
Written Opinion in SG Patent Application No. 11201403642T dated Jun. 11, 2015.
ELIANE™ The new waxy potato starch of AVEBE; Dec. 31, 2006; retrieved from http://www.agfdt.de/loads/st06/semeiabb.pdf.
Further Examination Report in NZ Patent Application No. 625992 dated Jun. 30, 2015.
Pendrous, Rick. "Healthy Gets Tasty" retrieved from http://www.foodmanufacture.co.uk/Ingredients/Healthy-gets-tasty (published online Nov. 4, 2005).

* cited by examiner

Sample C-1

Sample C-2

Sample C-3

Sample C-4

Sample C-5

Sample C-6

Sample C-7

STABILIZED NUTRITIONAL COMPOSITIONS INCLUDING STARCH

CROSS REFERENCE TO RELATED APPLICATIONS

This application is the U.S. national stage entry of PCT/US2012/067555, with an international filing date of Dec. 3, 2012, which is hereby incorporated by reference herein in its entirety and which claims priority to and any other benefit of the U.S. provisional patent application Ser. No. 61/581,640, filed on Dec. 30, 2011, and U.S. provisional patent application Ser. No. 61/581,642, filed Dec. 30, 2011, the disclosures of which are hereby incorporated by reference herein in their respective entireties.

FIELD OF THE DISCLOSURE

The present disclosure relates to nutritional compositions including a stabilizer system that provides improved emulsion stability and reduced precipitation without retrogradation. More particularly, the present disclosure relates to liquid nutritional compositions including a stabilizer system. The stabilizer system may comprise a starch or a combination of starch and maltotriose.

BACKGROUND OF THE DISCLOSURE

Manufactured liquid nutritional compositions, also commonly referred to as nutritional liquids, comprising a targeted selection of nutrition ingredients are well known and widely available, some of which may provide a sole source of nutrition while others may provide a supplemental source. These nutritional liquids include powders that can be reconstituted with water or other aqueous liquid, as well as concentrated liquids and ready to drink nutritional liquids such as milk or protein based emulsions or non-emulsified or substantially clear liquids for use in infant and pediatric formulas and medical and adult nutritionals.

Traditionally, native starches have been included in food applications, and particularly in liquid nutritional emulsions and other liquids, for their ability to stabilize emulsions and suspensions, increase viscosity, reduce sedimentation, form film networks, and gelatinize. More particularly, these desired gelatinization and stable network formation abilities of natural starches occur with heat after starch granules are fully hydrated. Gelatinized starch molecules, however, also tend to re-associate over time, squeezing water out and causing recrystallization (also referred to herein as retrogradation). The retrogradation effect is a result of starch chains forming ordered chain structures that result in chain aggregation, which is revealed as phase separation in liquid nutritionals.

The retrogradation tendency of starches limits their functionality in food applications as it shortens the resulting shelf life of the product. Retrogradation may be further exaggerated with temperature fluctuations similar to those seen in process conditions during the manufacturing and sterilization of nutritional liquids.

To combat the undesired retrogradation effect, many native starches are chemically modified to reduce chain formation in liquid nutritionals as described above. Although this approach has had some success, such chemical modification may present issues with multiple regulatory bodies around the world that do not generally approve of the use of chemically modified starches in nutritional liquids, and particularly in infant nutritional liquids.

Accordingly, there is a need in the art for alternative stabilizer systems that can provide improved emulsion stabilization and reduced precipitation without the drawbacks of retrogradation and reassociation. Additionally, it would be advantageous if the stabilizer system was carrageenan-free as such stabilizer systems including carrageenan are not universally accepted from a regulatory standpoint around the world.

The present disclosure is directed to nutritional compositions, particularly in the form of liquid nutritional compositions comprising starch. The stabilizer system may comprise starch, more particularly waxy starch, more particularly, a native waxy starch such as a native hybrid waxy potato starch. In addition, or in the alternative, the stabilizer system may be a dual stabilizer system including a starch and maltotriose. These nutritional compositions provide improved stability, longer shelf life, and are universally label friendly from a regulatory standpoint.

SUMMARY OF THE DISCLOSURE

The present disclosure is generally directed to a stabilized solid (capable of being made into a liquid by reconstitution) or liquid nutritional composition comprising a stabilizer system such that the nutritional composition has improved emulsion stability and suspension properties. In some embodiments, the stabilizer system comprises, consists of, or consists essentially of starch and maltotriose. In a further embodiment, the stabilizer system comprises, consists of, or consists essentially of a native hybrid waxy potato starch. In any of the embodiments, the stabilizer system can be carrageenan and/or cellulose gum free. The nutritional composition may be designed to be suitable for use as an infant nutritional composition, such as a preterm infant liquid nutritional composition, or an adult liquid nutritional composition.

The present disclosure is further directed to a liquid nutritional composition, such as a liquid infant formula, comprising a stabilizer system. In some embodiments, the stabilizer system comprises, consists of, or consists essentially of starch, and maltotriose. In some embodiments, the stabilizer system comprises, consists of, or consists essentially of a native hybrid waxy potato starch. The present disclosure is further directed to a stabilized liquid infant formula comprising a stabilizer system and at least one of a protein, a fat and a carbohydrate.

The present disclosure is further directed to a process for manufacturing a stabilized liquid nutritional composition, such as a liquid infant formula. In some embodiments, the process comprises introducing a starch and maltotriose and/or introducing a native hybrid waxy potato starch, into a liquid nutritional composition comprising at least one of protein, fat, and carbohydrate and heating the liquid nutritional composition to form the stabilized liquid nutritional composition.

In some embodiments, the process comprises introducing maltotriose into a carbohydrate-mineral slurry and mixing the carbohydrate-mineral slurry with at least one of a protein-in-water slurry and a protein-in-fat slurry to form a liquid nutritional composition and introducing a starch into the liquid nutritional composition and heating the liquid nutritional composition including the starch to form the stabilized liquid nutritional composition.

The present disclosure is further directed to a stabilized liquid infant formula comprising a stabilizer system, a protein component, a fat component, and a carbohydrate component. The stabilizer system comprises a native hybrid waxy potato starch. The protein component comprises skim milk and whey protein concentrate. The fat component comprises soy oil, coconut oil, and medium chain triglyceride oil. The carbohydrate component comprises corn syrup solids and lactose.

The stabilized nutritional compositions as described herein not only provide sufficient nutritional benefits for individuals, including both infants and adults, but also allow for the use of an improved stabilizer system that may be universally label friendly. It has been unexpectedly found that when starch is used in a stabilizer system, either alone or in combination with an additional stabilizer, the retrogradation effect commonly seen with starch stabilizers is substantially reduced or even eliminated such that the liquid nutritional composition remains stable for an extended period of time.

DETAILED DESCRIPTION OF THE DISCLOSURE

Figure 1:
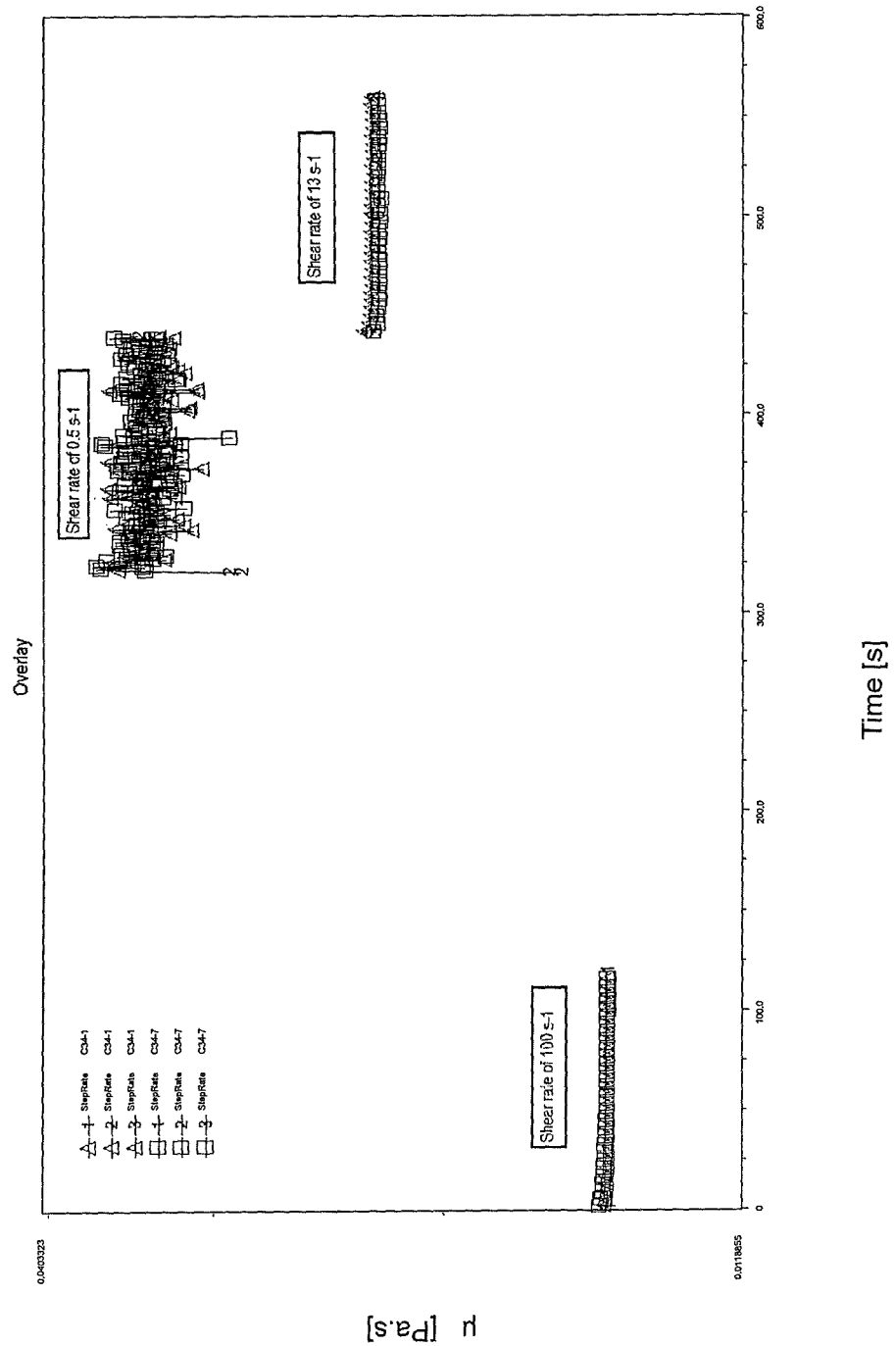
FIG. 1 is a graph depicting step rate measurements as obtained in Example 2.

The liquid nutritional compositions of the present disclosure comprise a stabilizer system including a starch. In some embodiments, the stabilizer system comprises starch and maltotriose. The starch may be a native (non-chemically modified) waxy starch and in some embodiments, a native hybrid waxy potato starch. In some embodiments, native hybrid waxy potato starch is the sole stabilizer in the liquid nutritional composition, while in other embodiments the native hybrid waxy potato starch is used in combination with other stabilizers. In some embodiments, the stabilizer system is a combination of starch and maltotriose, which results in a long term stable liquid nutritional composition that has reduced sedimentation.

The stabilizer system including starch and in some embodiments, further comprising maltotriose, address a primary problem with liquid nutritional compositions and provides significant advantages over conventional starch-based stabilizers that over time can allow sedimentation and phase separation to occur in the liquid nutritional composition. When a stabilizer system of the present disclosure is in the liquid nutritional composition, precipitation is substantially minimized or even eliminated in some embodiments, while emulsion stability and viscosity is maintained. This reduction/elimination of precipitation and enhanced emulsion stability and viscosity is maintained even in liquid nutritional compositions that have very high concentrations of insoluble solutes. The described stabilizer systems provide the additional advantage of performing very well in the absence of carrageenan such that the liquid nutritionals can be formulated to be carrageenan-free. This may allow liquid nutritional compositions, including liquid infant formulas, to be prepared that are emulsion stable over time, free or nearly free of sedimentation, and universally accepted from a regulatory standpoint, thus providing significant commercial advantages.

These and other features of the liquid nutritional compositions, as well as some of the many optional variations and additions, are described in detail hereafter.

The genus "starch" as used herein, unless otherwise specified, includes the species: "waxy starch," "native waxy starch," and "native hybrid waxy potato starch."

The term "nutritional product" as used herein, unless otherwise specified, refers to nutritional liquids and nutritional powders, the latter of which may be reconstituted to form a nutritional liquid, all of which comprise one or more of fat, protein, and carbohydrate and are suitable for oral consumption by a human.

The terms "liquid nutritional composition," "liquid nutritionals," and "nutritional liquid" are used interchangeably herein, and unless otherwise specified, refer to nutritional products in ready-to-drink liquid form and concentrated form.

The terms "substantially clear nutritional liquid" and "non-emulsion" as used herein, unless otherwise specified, are used interchangeably to refer to a non-emulsified or similar other liquid having a visibly clear or translucent appearance, which liquid may and typically will have a thin or watery texture with a consistency similar to that of a clear juice and most typically having a viscosity of less than about 25 centipoises as determined by a Brookfield viscometer at 22° C. using a #1 spindle at 60 rpm.

The terms "stabilizer" or "stabilizer system" refer to one or more components of a nutritional product that prevents retrogradation of the nutritional product for a period of at least 12 hours, including at least 24 hours, including at least 48 hours, including at least 7 days, including at least 1 month, including at least 2 months, including at least 4 months, including at least 6 months, and including at least 9 months, 12 months, 18 months, or longer.

The terms "fat" and "oil" as used herein, unless otherwise specified, are used interchangeably to refer to lipid materials derived or processed from plants or animals. These terms also include synthetic lipid materials so long as such synthetic materials are suitable for oral administration to humans.

The terms "stable" and "shelf stable" as used herein, unless otherwise specified, refer to a liquid nutritional composition that remains commercially stable after being packaged and then stored at 18-24° C. for at least 3 months, including from about 6 months to about 24 months, and also including from about 12 months to about 18 months.

The terms "retort packaging" and "retort sterilizing" are used interchangeably herein, and unless otherwise specified, refer to the common practice of filling a container, most typically a metal can or other similar package, with a liquid nutritional composition and then subjecting the liquid-filled package to the necessary heat sterilization step, to form a sterilized, retort packaged, liquid nutritional product.

The term "aseptic packaging" as used herein, unless otherwise specified, refers to the manufacture of a packaged product without reliance upon the above-described retort packaging step, wherein the liquid nutritional composition and package are sterilized separately prior to filling, and then are combined under sterilized or aseptic processing conditions to form a sterilized, aseptically packaged, liquid nutritional product.

The term "infant formula" as used herein, unless otherwise specified, refers to liquid or solid infant formulas and toddler formulas, wherein infant formulas are intended for infants up to about 1 year of age and toddler formulas are intended for children from about 1 year of age to about 10 years of age.

The term "preterm infant formula" as used herein, unless otherwise specified, refers to liquid or solid nutritional compositions suitable for consumption by a preterm infant. The teen "preterm infant" as used herein, refers to a person born prior to 36 weeks of gestation.

The term "adult nutritional product" as used herein includes formulas, including, but not limited to liquid formulas, for generally maintaining or improving the health of an adult, and includes those formulas designed for adults who need to control their blood glucose.

All percentages, parts and ratios as used herein, are by weight of the total composition, unless otherwise specified. All such weights as they pertain to listed ingredients are based on the active level and, therefore; do not include solvents or by-products that may be included in commercially available materials, unless otherwise specified.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The various embodiments of the nutritional products of the present disclosure may also be substantially free of any optional or selected ingredient or feature described herein, provided that the remaining nutritional product still contains all of the required ingredients or features as described herein. In this context, and unless otherwise specified, the term "substantially free" means that the selected nutritional product contains less than a functional amount of the optional ingredient, typically less than about 1%, including less than about 0.5%, including less than about 0.1%, and also including zero percent, by weight of such optional or selected ingredient.

The nutritional product may comprise, consist of, or consist essentially of the elements of the products as described herein, as well as any additional or optional element described herein or otherwise useful in nutritional product applications.

Product Form

The nutritional products include both ready-to-feed liquids and concentrated liquids and liquids derived from nutritional powders (reconstituted liquids). The liquids may include solutions, suspensions, and emulsions, including clear solutions/suspensions that may be fat-free. The powders that are reconstituted to produce a liquid may include any flowable or scoopable particulate solid that can be diluted with water or other aqueous liquid to form a nutritional liquid prior to use.

The nutritional products may be formulated with sufficient kinds and amounts of nutrients to provide a sole, primary, or supplemental source of nutrition, or to provide a specialized nutritional product for use in individuals afflicted with specific diseases or conditions or with a targeted nutritional benefit.

The nutritional products of the present disclosure comprising starch include human milk fortifiers, preterm and term infant formulas, pediatric and toddler formulas, follow-on formulas and adult nutritionals, medical nutritionals, sports nutritional formulas, and sports drinks, all of which may be in liquid or powdered form.

Nutritional Powders

The nutritional powders including starch may be reconstituted by the intended user with a suitable aqueous liquid, typically water or other aqueous liquid, in an amount or volume sufficient to form a nutritional liquid for immediate oral or enteral use. The starch present in the reconstituted liquid will improve the emulsion stability and suspension characteristics of the reconstituted liquid.

In this context, "immediate" use generally means within about 48 hours, more typically within about 24 hours, most typically right after or within 20 minutes of reconstitution. Further, when reconstituted, the nutritional powders provide the desired ingredient concentrations as described hereinafter for the nutritional liquid embodiments.

The nutritional powders may include spray dried powders, dry mixed powders, agglomerated powders, combinations thereof, or powders prepared by other suitable methods. The starch may be included in the nutritional powders by either adding the native starch to one or more liquid slurries prior to the slurries being spray dried or it may be dry-blended into a base powder.

Nutritional Liquids

The nutritional liquids may be formulated in a variety of forms, including emulsions such as oil-in-water, water-in-oil, or complex aqueous emulsions, although such emulsions are most typically in the form of oil-in-water emulsions having a continuous aqueous phase and a discontinuous oil phase, suspensions, or clear or substantially clear liquids. The stabilizer systems of the present disclosure improve the emulsion stability and suspension characteristics of the nutritional liquids.

The nutritional liquids may be and typically are shelf stable. The nutritional liquids typically contain up to about 95% by weight of water, including from about 50% to about 95%, also including from about 60% to about 90%, and also including from about 70% to about 85%, of water by weight of the nutritional liquid.

The nutritional liquids may have a caloric density tailored to the nutritional needs of the ultimate user, although in most instances the liquids comprise generally at least 19 kcal/fl oz (660 kcal/liter), more typically from about 20 kcal/fl oz (675-680 kcal/liter) to about 25 kcal/fl oz (820 kcal/liter), even more typically from about 20 kcal/fl oz (675-680 kcal/liter) to about 24 kcal/fl oz (800-810 kcal/liter). Generally, the 22-24 kcal/fl oz formulas are more commonly used in preterm or low birth weight infants, and the 20-21 kcal/fl oz (675-680 to 700 kcal/liter) formulas are more often used in term infants. In some embodiments, the liquid may have a caloric density of from about 100 kcal/liter to about 660 kcal/liter, including from about 150 kcal/liter to about 500 kcal/liter.

The nutritional liquid may have a pH ranging from about 3.5 to about 8, but are most advantageously in a range of from about 4.5 to about 7.5, including from about 4.5 to about 7.0, including from about 4.5 to about 6.7, including from about 4.5 to about 6.5, and including from about 4.5 to about 6.0. In some embodiments, the pH range includes from about 5.5 to about 7.3, including from about 5.5 to about 7.0, including from about 5.5 to about 6.5, and including from about 5.5 to about 6.0. In still other embodiments, the pH range may be from about 6.2 to about 7.2, including from about 6.2 to about 7.0, and including from about 6.2 to about 6.5.

Although the serving size for the nutritional liquid can vary depending upon a number of variables, a typical serving size is generally at least 2 mL, or even at least 5 mL, or even at least 10 mL, or even at least 25 mL, including ranges from about 2 mL to about 300 mL, including from about 4 mL to about 250 mL, and including from about 10 mL to about 240 mL.

Starch Component of the Stabilizer System

In some embodiments, the nutritional liquids include a stabilizer system including starch and maltotriose. In some embodiments, the nutritional liquids comprise at least one native (non-chemically modified) starch. In some embodiments, the nutritional liquids comprise at least one waxy starch. In some embodiments, the nutritional liquid comprises at least one hybrid waxy potato starch. As used herein, the term "hybrid" means the offspring of two plants, such as two potato plants, of different breeds, varieties or species. The native hybrid waxy potato starch in the liquid nutritional is both a stabilizer as described herein and a carbohydrate nutritional component, as noted below.

The stabilizer system may comprise, consist essentially of, or consist of starch and maltotriose. In some embodiments, the stabilizer may comprise native hybrid waxy potato starch. In some embodiments, starch may be used in combination with other, conventionally known stabilizers such as xanthan gum, carrageenan, and the like. In some embodiments, the nutritional composition including the native hybrid waxy potato starch is substantially carrageenan-free. In other embodiments, the nutritional product including the native hybrid waxy potato starch is substantially cellulose gum-free. In these embodiments, the term "substantially free" means no more than a trace amount that would not impact the properties of the product, and include a zero amount.

In some embodiments, the liquid nutritional products of the present disclosure comprise a stabilizer system including a waxy starch and maltotriose, and in some embodiments include only a waxy starch and maltotriose, such that the liquid nutritional only contains a waxy starch and maltotriose as the stabilizer. The waxy starch component may be any starch known for use in oral nutritional products, and may include, for example, waxy and non-waxy starches, including native waxy and native non-waxy starches, all of which can serve as both a nutritional component as well as a stabilizer. Exemplary waxy and non-waxy starches include native waxy and non-waxy potato starch, native waxy and non-waxy wheat starch, native waxy and non-waxy corn starch, native waxy and non-waxy rice starch, and the like. Additionally, modified (including chemically modified) waxy and non-waxy starches can be used with maltotriose in the stabilizer system, in some embodiments in accordance with the present disclosure.

One particularly suitable starch is a waxy starch, including a native (non-chemically modified) hybrid waxy potato starch. Native hybrid waxy potato starches have now been unexpectedly found to be advantageous stabilizers for nutritional products, and in particular, liquid nutritional compositions, as waxy potato starches obtained from native potato hybrids may, in some embodiments, advantageously be prepared to have a very low (less than 20% by weight) amylose content, large (greater than about 5 µm) granule size, and low (less than 0.07% by weight) protein content, all of which may provide beneficial emulsion stability and suspension properties in liquid nutritionals as described in detail below.

Utilizing a native hybrid waxy potato starch with a low amylose content as a stabilizer in a liquid nutritional composition may allow for a reduced possibility of retrogradation in the resulting nutritional liquid as amylase is a generally linear carbohydrate polymer that may tend in some nutritional solutions to symmetrically align against itself and thus have a repulsion effect on other components, which can lead to retrogradation such that emulsion stability and suspension properties are reduced. As such, in some embodiments of the present disclosure, the native hybrid waxy potato starch for use in the nutritional compositions of the present disclosure will have an amylose content of less than 20%, including less than 10%, including less than 5%, including less than 4%, including less than 3%, including less than 2%, and including less than 1% by weight.

Additionally, the large granular size and branching of any amylopectin polymers present, which may retard retrogradation due to their branched structure, in the native hybrid waxy potato starch may provide for a cohesive, stronger network formation when the starch is heated, such as during retort or aseptic processing of the final nutritional product, and thus, further inhibit the potential retrogradation effect. Using larger granular sizes of the native hybrid waxy potato starch may provide for slower mobility of many carbohydrate polymers present in the liquid, which can also further inhibit retrogradation and the resulting unwanted emulsion and sedimentation effects. Suitable large granular sizes include typically from about 5 µm to about 100 µm, including from about 10 µm to about 100 µm, including from about 20 µm to about 100 µm, including from about 30 µm to about 100 µm, including from about 50 µm to about 90 µM, including from about 50 µm to about 80 µm.

In addition to the benefit of a reduction in retrogradation effect, the starch used in the nutritional products described herein has a relatively low protein content, thus allowing the resulting liquid nutritional products to have reduced incidences of allergic reactions. This is particularly desirable when the nutritional product is to be used in infant and preterm infant nutritional products. The starch for use in the nutritional products of the present disclosure has a protein content by weight of less than 0.07%, including less than 0.05%, and including less than 0.04%, including less than 0.03%, including less than 0.02%. In some embodiments, the protein content by weight is from about 0.02% to about 0.07%, including from about 0.02% to about 0.05%.

Additionally, the starch includes phosphorus, generally present in the form of phosphate monoesters. Phosphate monoesters are negatively charged molecules, and thus may increase the repulsion of many polymers from each other such that the polymers present are less likely to align as described above and cause retrogradation. This repulsion phenomena may cause an increase in water binding capacity, swelling power and paste clarity as the network formation is improved as the starch molecules are less likely to associate.

The amount of starch in the nutritional products to provide sufficient stabilization will generally depend on the product form, other components of the nutritional product and/or the targeted use of the nutritional product.

One suitable native hybrid waxy potato starch for use in the nutritional compositions of the present disclosure is commercially available as an ELIANE™ native hybrid waxy potato starch, available from Avebe Food (The Netherlands).

For powdered nutritional compositions that are reconstituted with a liquid prior to use, embodiments comprising suitable amounts of starch in the powder may range from about 0.05% by weight to about 20% by weight total nutritional product, including from about 2.0% by weight to about 15% by weight total nutritional product, and including from about 5% by weight to about 8% by weight total nutritional product. In one specific embodiment, when used in powdered infant nutritional products, suitable amounts of native hybrid waxy potato starch in the powder may include from about 0.05% by to about 5.0% by weight total nutritional composition, including from about 1.0% by weight to about 5.0% by weight total nutritional composition.

In embodiments comprising starch and maltotriose components of the stabilizer system, suitable amounts of starch may range from about 0.05% by weight to about 60% by weight total nutritional product, including from about 0.1% by weight to about 15% by weight total nutritional product, and including from about 0.5% by weight to about 2% by weight total nutritional product. More particularly, when used in infant nutritional products, suitable amounts of starch may include no more than 2% by weight total infant nutritional product, including from 0.5% by weight to 2% by weight total infant nutritional product.

Liquid nutritional products may be either in ready to drink or concentrated form. Suitable amounts of native hybrid waxy starch may range from about 0.5% by weight to about 15% by weight of the total nutritional product including from about 0.5% to about 10% by weight total nutritional product and including from about 1.0% by weight to about 5.0% by weight total nutritional product. In one specific embodiment, when used in ready-to-drink or concentrated liquid infant nutritional products, suitable amounts of native hybrid waxy potato starch may include no more than 2% by weight total liquid infant nutritional product, including from about 0.5% to about 2% by weight total liquid infant nutritional product, including from about 0.5% to about 1.4% by weight liquid infant nutritional product, including about 0.8% by weight total liquid infant nutritional product.

Maltotriose Component of the Stabilizer System

The stabilizer system of the nutritional products may include maltotriose in combination with the starch. Maltotriose is a polyhydroxy compound, and particularly a trisaccharide, consisting of three glucose molecules linked with α-1,4 glycosidic bonds as shown in the formula below.

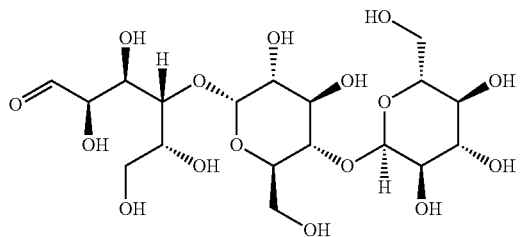 [SMILES: O=C[C@H](O)[C@@H](O)[C@H](O[C@H]1O[C@H](CO)[C@@H](O[C@H]2O[C@H](CO)[C@@H](O)[C@H](O)[C@H]2O)[C@H](O)[C@H]1O)[C@H](O)CO]

Maltotriose is most commonly produced by the digestive enzyme alpha-amylase on amylose in starch. The creation of both maltotriose and maltose during this process is due to the random manner in which alpha-amylase hydrolyses α-1,4 glycosidic bonds.

Maltotriose may be found in some maltodextrin sources. The percentage of maltotriose in conventional maltodextrin sources, however, is relatively low. A particularly suitable maltotriose source includes maltodextrin including about 50% by weight maltotriose, available from National Starch (Bridgewater, N.J.).

The amount of maltotriose in the nutritional product will typically depend on the amount and type of starch present in the nutritional product. For example, higher concentrations of maltotriose may be required when non-waxy starches are used as the starch in the nutritional product. The nutritional products typically include maltotriose in an amount of from about 0.01% by weight to about 15% by weight, including from about 0.01% by weight to about 10% by weight, and including from about 0.01% by weight to about 2% by weight total nutritional product.

Protein

The nutritional products may further comprise any proteins or sources thereof that are suitable for use in oral nutritional products and are compatible with the essential elements and features of such products. Total protein concentrations in the nutritional products may range from about 0.5% to about 30%, including from about 1% to about 15%, and also including from about 2% to about 10%, by weight of the nutritional product.

Non-limiting examples of suitable protein or sources thereof for use in the nutritional products include hydrolyzed, partially hydrolyzed or non-hydrolyzed proteins or protein sources, which may be derived from any known or otherwise suitable source such as milk (e.g., casein, whey), animal (e.g., meat, fish), cereal (e.g., rice, corn), vegetable (e.g., soy), or combinations thereof. Non-limiting examples of such proteins include milk protein isolates, milk protein concentrates as described herein, casein protein isolates, whey protein, sodium or calcium caseinates, whole cow's milk, partially or completely defatted milk, soy protein isolates, soy protein concentrates, and so forth. Particularly preferred protein sources include skim milk, including condensed skim milk, and whey protein concentrate, alone or in combination.

The optional protein in the nutritional products may include soluble proteins as that term is defined herein to improve product stability and minimize the development of bitter flavors and after taste in the composition during shelf life.

The soluble protein may represent up to 100% of the total protein in the nutritional product, including from about 65% to 100%, including from 80% to 100%, including from about 85% to about 100%, including from about 90% to about 100%, including from about 95% to about 100%, and also including about 100%, by weight of the total protein in the nutritional product. The concentration of soluble protein may range from at least 0.5%, including from about 1% to about 30%, and also including from about 2% to about 15%, also including from about 3% to about 10%, and also including from about 3% to about 5%, by weight of the nutritional liquid.

The term "soluble protein" as used herein, unless otherwise specified, refers to those proteins having a protein solubility of at least 40%, including from 50% to 100%, and also including from 60% to 90%, as measured in accordance with the following process: (1) suspend protein ingredient in purified water at 5.00 g per 100 g of suspension; (2) adjust the pH of the suspension to 3.5 or the desired product pH (e.g., 4.6 or other) using HCl, phosphoric acid, citric acid or combinations thereof; (3) stir vigorously at room temperature (20° C.-22° C.) for 60 minutes; (4) measure total protein in the suspension by any suitable technique (including the HPLC technique described below); (5) centrifuge an aliquot of the suspension at 31,000×g and at 20° C. for 1 hour; (6) measure the supernatant for protein by the selected technique as described in step (4); and (7) calculate protein solubility as the supernatant protein percentage of the total protein.

Protein concentrations (per step 4 above) can be measured in the protein solubility process by any known or otherwise suitable method for determining such concentrations, many of which are well known in the analytical art. An example of one such suitable method is by HPLC analysis in accordance with the following specifications: (1) Column: Shodex KW-804 protein size exclusion chromatography column, Waters P/N WAT036613; (2) Mobile Phase: 0.05M $NaH_2PO_4$, 0.15M NaCl, pH=7.0; (3) Flow Rate: 0.3 mL/minute; (4) Temperature: 22° C.; (5) Detection: UV at 214 nm; (6) Injection: 10 µL; (7) Run Time: 90 minutes; (8) System Calibration: protein standard solutions prepared at 0.5-3.0 g/L in mobile phase; and (9) Sample Preparation: dilute to about 1.5 g/L protein with mobile phase.

Any soluble protein source is suitable for use herein provided that it meets the solubility requirement as defined herein, some non-limiting examples of which include whey protein concentrate (>90% solubility), whey protein isolate (>90% solubility), casein hydrolysate (>60% solubility), hydrolyzed collagen, combinations thereof. Non-soluble proteins may of course also be included in the nutritional products described herein provided that the remaining soluble protein component is represented in accordance with the requirements as set forth herein. The composition may be substantially free of proteins other than the soluble protein as described herein.

It should be noted that any protein selected for use herein as a soluble protein should also meet the solubility testing requirements noted above even if the protein is whey protein concentrate, casein hydrolysate, or other typically soluble protein since protein solubility can vary significantly with the selection of raw material lots, sources, brands, and so forth.

In a particularly desirably embodiment, the protein system includes a combination of condensed skim milk and whey protein concentrate.

Carbohydrate

The nutritional products may further comprise any carbohydrates or sources thereof that are suitable for use in an oral nutritional product and are compatible with the essential elements and features of such products in addition to the native hybrid waxy potato stabilizing starch and/or the starch and maltotriose combination, which is also a carbohydrate component. Carbohydrate concentrations in the liquid nutritional compositions, for example, may range from about 5% to about 40%, including from about 7% to about 30%, and including from about 10% to about 25%, by weight of the liquid nutritional composition.

Non-limiting examples of suitable carbohydrates or sources thereof for use in the nutritional products described herein, in addition to the starch and maltotriose, may include maltodextrin, glucose polymers, corn syrup, corn syrup solids, rice-derived carbohydrates, sucrose, glucose, fructose, lactose, high fructose corn syrup, honey, sugar alcohols (e.g., maltitol, erythritol, sorbitol), artificial sweeteners (e.g., sucralose, acesulfame potassium, stevia) and combinations thereof. Lactose and corn syrup solids are particularly preferred carbohydrates, and can be used alone or in combination in the liquid nutritionals described herein.

Fat

The nutritional products may further comprise any fats or sources thereof that are suitable for use in an oral nutritional product and are compatible with the elements and features of such products, most typically as emulsified fat, concentrations of which may range from about 1% to about 30%, including from about 2% to about 15%, and also including from about 4% to about 10%, by weight of the liquid nutritional composition.

Suitable sources of fat for use herein include any fat or fat source that is suitable for use in an oral nutritional product and is compatible with the essential elements and features of such products.

Non-limiting examples of suitable fats or sources thereof for use in the nutritional emulsions described herein include coconut oil, fractionated coconut oil, soy oil, corn oil, olive oil, safflower oil, high oleic safflower oil, MCT oil (medium chain triglycerides), sunflower oil, high oleic sunflower oil, palm and palm kernel oils, palm olein, canola oil, marine oils, cottonseed oils, and combinations thereof. Particularly preferred fats include soy oil, coconut oil, and MCT oil, each of which may be used alone or in any combination.

The amount of carbohydrates, fats, and/or proteins in any of the nutritional products described herein may also be characterized in addition to, or in the alternative, as a percentage of total calories in the nutritional product as set forth in the following table. These macronutrients for nutritional products of the present disclosure are most typically formulated within any of the caloric ranges (embodiments A-F) described in the following table (each numerical value is preceded by the term "about").

| Nutrient & Total Cal. | Embodiment A | Embodiment B | Embodiment C |
| --- | --- | --- | --- |
| Carbohydrate | 0-98 | 2-96 | 10-75 |
| Protein | 0-98 | 2-96 | 5-70 |
| Fat | 0-98 | 2-96 | 20-85 |
|  | Embodiment D | Embodiment E | Embodiment F |
| Carbohydrate | 30-50 | 25-50 | 25-50 |
| Protein | 15-35 | 10-30 | 5-30 |
| Fat | 35-55 | 1-20 | 2-20 |

In one specific example, liquid infant formulas (both ready-to-feed and concentrated liquids) include those embodiments in which the protein component may comprise from about 7.5% to about 25% of the caloric content of the formula; the carbohydrate component may comprise from about 35% to about 50% of the total caloric content of the infant formula; and the fat component may comprise from about 30% to about 60% of the total caloric content of the infant formula. These ranges are provided as examples only, and are not intended to be limiting. Additional suitable ranges are noted in the following table (each numerical value is preceded by the term "about").

| Nutrient & Total Cal. | Embodiment G | Embodiment H | Embodiment I |
| --- | --- | --- | --- |
| Carbohydrate | 20-85 | 30-60 | 35-55 |
| Protein | 5-70 | 20-60 | 25-50 |
| Fat | 2-75 | 5-50 | 7-40 |

Optional Ingredients

The nutritional products described herein may further comprise other optional ingredients that may modify the physical, chemical, hedonic or processing characteristics of the products or serve as pharmaceutical or additional nutritional components when used in the targeted population. Marty such optional ingredients are known or otherwise suitable for use in other nutritional products and may also be used in the nutritional products described herein, provided that such optional ingredients are safe and effective for oral administration and are compatible with the essential and other ingredients in the selected product form.

Non-limiting examples of such optional ingredients include preservatives, antioxidants, emulsifying agents, buffers, pharmaceutical actives, additional nutrients as described herein, colorants, flavors, thickeners, additional stabilizers, and so forth.

The products may further comprise vitamins or related nutrients, non-limiting examples of which include vitamin A, vitamin D, vitamin E, vitamin K, thiamine, riboflavin, pyridoxine, vitamin B12, carotenoids, niacin, folic acid, pantothenic acid, biotin, vitamin C, choline, inositol, salts, and derivatives thereof, and combinations thereof.

The products may further comprise minerals, non-limiting examples of which include phosphorus, magnesium, calcium, iron, zinc, manganese, copper, sodium, potassium, molybdenum, chromium, selenium, chloride, and combinations thereof.

The products may also include one or more flavoring or masking agents. Suitable flavoring or masking agents include natural and artificial sweeteners, sodium sources such as sodium chloride, and hydrocolloids, and combinations thereof.

Methods of Manufacture

The nutritional products as described herein may be manufactured by any known or otherwise suitable method for making the nutritional product form selected. Nutritional liquids may be prepared, for example, by any of the well known methods of formulating nutritional liquids by way of retort, aseptic packaging, or hot fill processing methods. Such methods are well known in the nutrition formulation and manufacturing arts.

In one suitable manufacturing process, for example, at least three separate slurries are prepared, including a protein-in-fat (PIF) slurry, a carbohydrate-mineral (CHO-MIN) slurry, and a protein-in-water (PIW) slurry. The PIF slurry is formed by heating and mixing the oil (e.g., canola oil, corn oil, etc.) and then adding an emulsifier (e.g., lecithin), fat soluble vitamins, and a portion of the total protein (e.g., milk protein concentrate, etc.) with continued heat and agitation. The CHO-MIN slurry is formed by adding with heated agitation to water: minerals (e.g., potassium citrate, dipotassium phosphate, sodium citrate, etc.), trace and ultra trace minerals (TM/UTM premix), thickening or suspending agent. The resulting CHO-MIN slurry is held for 10 minutes with continued heat and agitation before adding additional minerals (e.g., potassium chloride, magnesium carbonate, potassium iodide, etc.), and/or carbohydrates (e.g., HMOs, fructooligosaccharide, sucrose, corn syrup, etc.). The PIW slurry is then formed by mixing with heat and agitation the remaining protein, if any.

The resulting slurries are then blended together with heated agitation and the pH adjusted to 6.6-7.0, after which the composition is subjected to high-temperature short-time (HTST) processing during which the composition is heat treated, emulsified and homogenized, and then allowed to cool. Water soluble vitamins and ascorbic acid are added, the pH is adjusted to the desired range if necessary, flavors are added, and water is added to achieve the desired total solid level. The composition is then aseptically packaged to form an aseptically packaged nutritional emulsion. This emulsion can then be further diluted, heat-treated, and packaged to form a ready-to-feed or concentrated liquid.

To form the stabilized liquid nutritional composition, the starch, or the starch and maltotriose can be introduced into the liquid nutritional composition prior to or after heat treatment. For example, in one embodiment, the starch or starch and maltotriose is introduced into the liquid nutritional composition formed from the blend of slurries described above, and then the liquid nutritional composition, including the starch or the starch and maltotriose, is heated to form the stabilized liquid nutritional composition. The liquid nutritional composition, including the starch or starch and maltotriose, is heated to a temperature of from about 55° C. to about 70° C. for a period of from about 30 minutes to about 90 minutes to form the stabilized liquid nutritional composition.

In one embodiment, native hybrid waxy potato starch may be hydrated to provide partial network formation prior to being introduced, in some embodiments with maltotriose, into the liquid nutritional composition. The starch may be hydrated at a temperature of from about 55° C. to about 70° C. for a period of from about 15 minutes to about 30 minutes to form the partial network. Typically, the starch is hydrated to a solids level of about 30%. Hydration and partial network formulation may then be completed by applying heat.

In one alternative embodiment, the maltotriose may be added into the CHO-MIN slurry and included in the resulting liquid nutritional composition. The starch is then introduced into the liquid nutritional composition, including the maltotriose, as described above.

In another embodiment, the nutritional composition is a solid nutritional composition such as a nutritional powder. Any methods known in the nutritional art for preparing nutritional powders may be used herein. By way of example, the nutritional powders can be prepared by drying the heated, homogenized liquid nutritional composition described above, such as by spray drying.

In one embodiment, the starch may first be hydrated and heated as described above and then dried to form a powdered, gelatinized starch. The dry powdered starch and maltotriose may then be dry-blended with a dry nutritional base powder.

Methods of Use

The nutritional compositions comprising the stabilizer systems disclosed herein show minimal to no retrogradation effects, providing for improved stabilization and enhanced shelf life of the compositions while providing nutrition to individuals. As noted herein, the nutritional compositions including the stabilizer system described herein are suitable for use as numerous types of nutritional products, including preterm infant formulas, term infant formulas, pediatric formulas, toddler formulas and adult formulas. The nutritionals are desirably formulated as liquid nutritionals and can have the added benefit of being substantially or completely carrageenan-free.

The methods of the present disclosure include the use of desirable embodiments as described herein. In one embodiment, the stabilizer system comprising starch and the stabilizer system comprising starch and maltotriose is a liquid nutritional composition comprising a protein, a carbohydrate, and a fat. The protein component includes skim milk, optionally in the form of condensed skim milk, and whey protein concentrate. In embodiments in which the stabilizer system comprises hybrid waxy potato starch, the carbohydrate component additionally includes corn syrup solids and lactose. The fat component includes a combination of coconut oil, soy oil, and medium chain triglyceride (MCT) oil. This is a particularly desirable embodiment that may also include vitamins, and minerals, as well as a source of DHA and ARA oil. This particularly preferred embodiment is carrageenan-free.

EXAMPLES

The following examples illustrate specific embodiments and or features of the nutritional compositions of the present disclosure. The examples are given solely for the purpose of illustration and are not to be construed as limitations of the present disclosure, as many variations thereof are possible without departing from the spirit and scope of the disclosure. All exemplified amounts are weight percentages based upon the total weight of the composition, unless otherwise specified.

The exemplified compositions are nutritional products that may be prepared in accordance with manufacturing methods well known in the nutrition industry for preparing nutritional emulsions, non-emulsions (e.g., substantially clear nutritional liquids), and nutritional powders.

Example 1

In this Example, ready-to-drink liquid infant formulas including a native hybrid waxy potato starch as described above were prepared and evaluated. The formulas were visually inspected for retrogradation effect.

Ready-to-drink liquid infant formulas (Similac® Special Care 24 HP) were prepared including 1.8% by weight ELIANE™ native hybrid waxy potato starch. The formulas, 20 bottles for each storage condition, were stored for one month in conditioning rooms at a temperature of 5° C., 37° C., and 45° C. Visual inspection of these infant liquid formulas at the end of the condition period surprisingly showed that none of the liquid infant formulas including the native hybrid waxy potato starch exhibited any retrogradation. There was no phase separation and/or sedimentation observed.

Example 2

In this Example, infant nutritional emulsions including a waxy potato starch, with or without maltotriose, were prepared as described. The rheologies of the resulting emulsions were analyzed for retrogradation effect.

Samples of a commercially available liquid infant formula were prepared adding 1.8% by weight waxy potato starch with (sample C34-7) or without (sample C34-1) 0.5% by weight maltotriose. Four rheologies measurements (frequency sweep measurements, step rate measurements, strain sweep measurements and temperature sweep measurements) of the samples were analyzed using an ARES-LS1 rheometer, available from TA Instruments (New Castle, Del.).

Step rate measurements were obtained by analyzing shear rate viscosity at 25° C. The shear viscosities at shear rates of $0.5^{s-1}$, $13^{s-1}$, and $100^{s-1}$ were recorded for 120 seconds. The last 90 seconds were averaged to obtain the viscosity value. The values from duplicate measurements were averaged. The results are shown in FIG. 1.

Strain sweep measurements are obtained by recording dynamic modulus as a function of strain at 25° C. The linear range in this data corresponds to elastic modulus wherein change as a function of strain is insignificant. The line fit is performed to identify the plateau elastic modulus. The frequency of the measurement is 10 rad/s. The plateau elastic moduli from duplicate measurements were averaged. The results are shown in FIG. 2.

Frequency sweep measurements were obtained using the plateau G' from the strain sweep measurements. The zero shear viscosity was calculated via the Ellis model. The results are shown in FIG. 3.

Figure 4:
FIG. 4 is a graph depicting temperature rate measurements as obtained in Example 2.

The temperature rate measurements are a rheology measurement as a function of temperature. Particularly, the determined $G'_p$ from the strain sweep measurement was used for the temperature rate measurements. The frequency of the measurements was 10 rad/s. The moduli values from duplicate measurements were averaged. The results are shown in FIG. 4.

Figure 2:
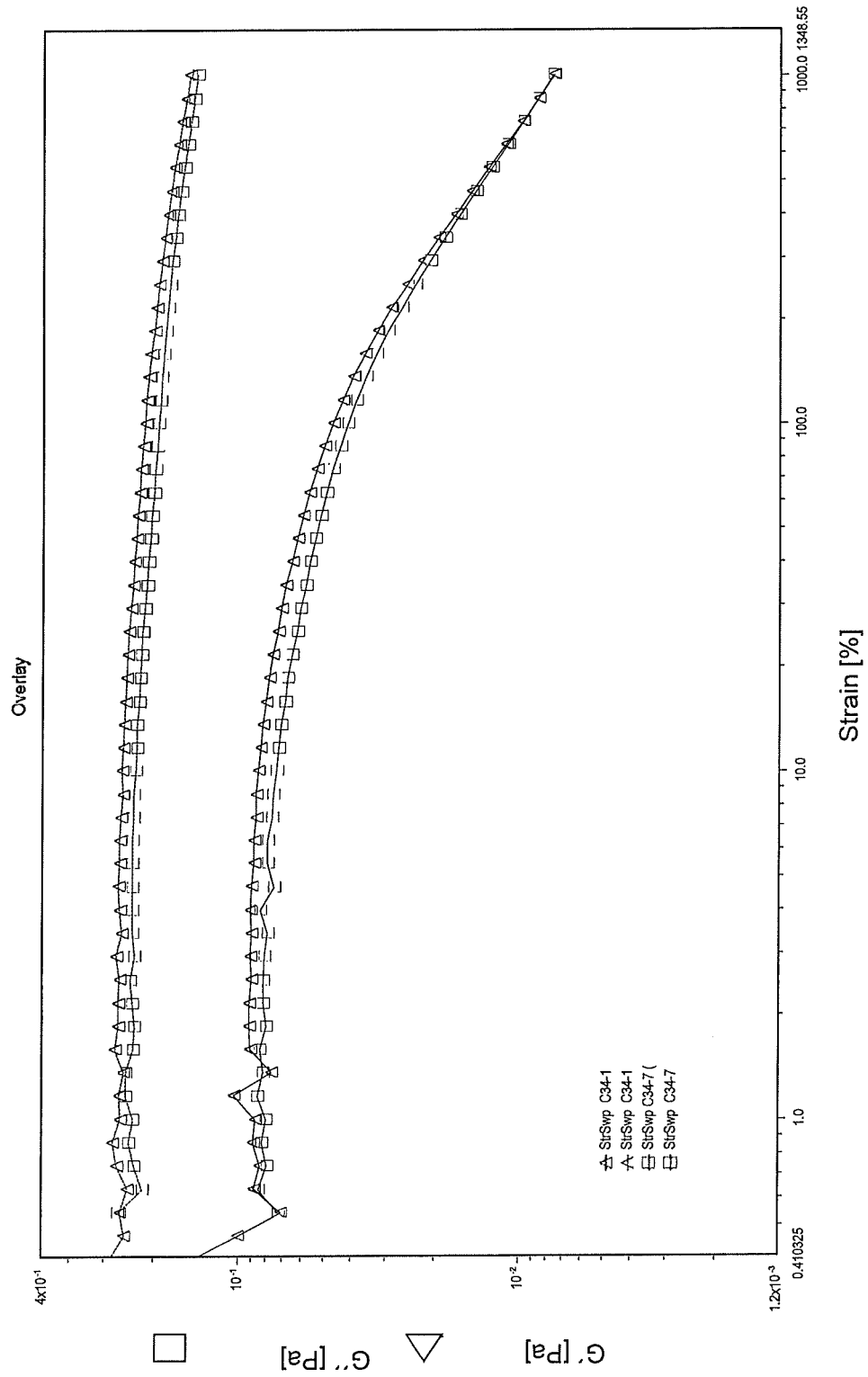
FIG. 2 is a graph depicting strain sweep measurements as obtained in Example 2.
Figure 3:
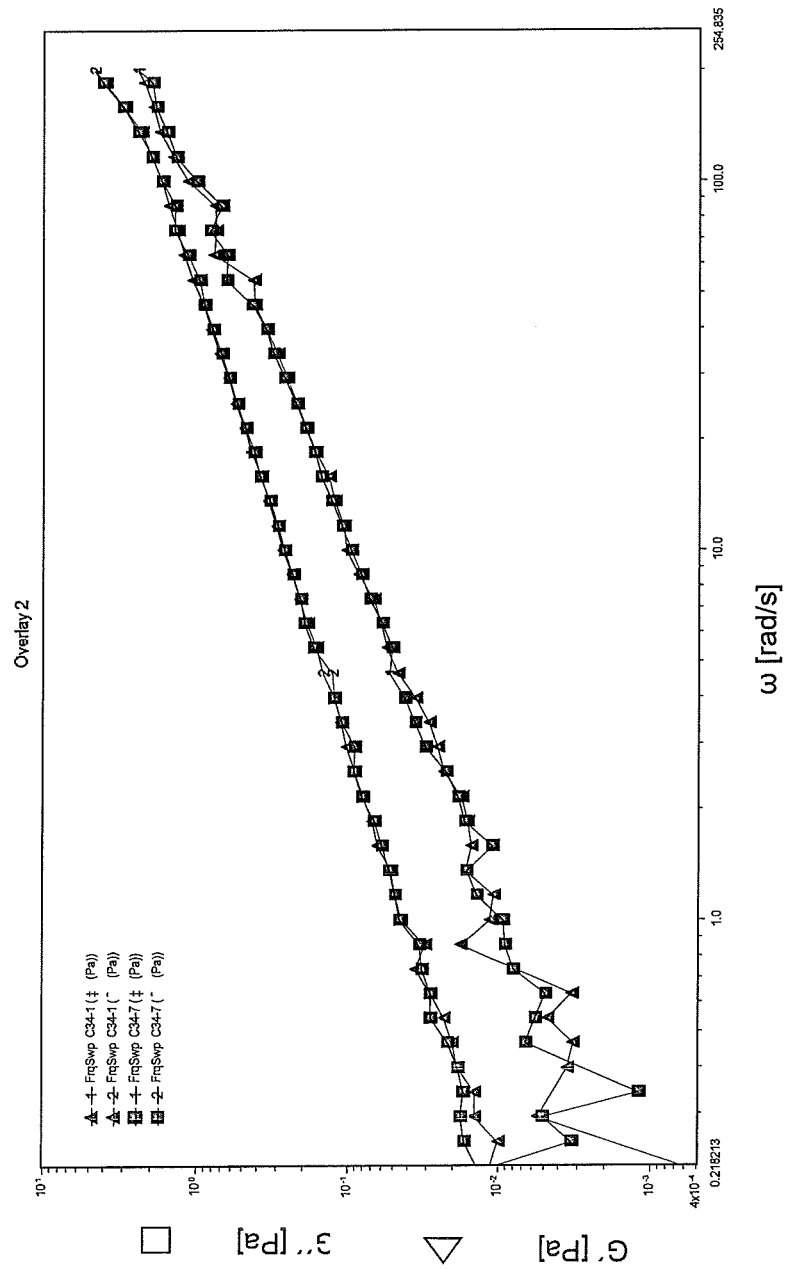
FIG. 3 is a graph depicting frequency sweep measurements as obtained in Example 2.

As shown in FIGS. 1-3, there was seen almost no difference in product qualities as the viscoelasticity of the products at room temperature were similar within the frequency domain (inverse of time). As shown in FIG. 4, however, at elevated temperatures the emulsion containing only the waxy potato starch (C34-1) started to develop elasticity and viscosity, indicating gel network build-up, while the emulsion containing starch and maltotriose (C34-7) showed a steady decline as a function of increased temperature. For example, product viscosity and elasticity at around 67° C. were, respectively, 149.3 mPa and 52.6 mPa for C34-1, and 101.2 mPa and 18.8 mPa for C34-7. These results indicate that the addition of maltotriose prevents the retrogradation effect, particularly at elevated temperature conditions.

Example 3

In this Example, multiple liquid infant nutritional emulsions including various types of starches were prepared and analyzed for emulsion/suspension stability.

Seven liquid infant nutritional emulsions were prepared using the starches as shown in the table below. Particularly, the starches were fully hydrated and heated to a temperature of about 150° F. (65.6° C.) for a period of about 15 minutes to allow for partial network formation. The aqueous heated starch slurry was then added to 15 mL samples of a commercially available ready-to-drink liquid infant formula.

| Sample | Starch | Tradename | Amount of Starch in Sample |
|---|---|---|---|
| C16-1 | Modified Waxy Rice | Novation ™ 8300 | 0.8 wt. % |
| C16-2 | Modified Waxy Rice | Novation ™ 8600 | 0.8 wt. % |
| C16-3 | Modified Potato containing 21% by weight amylose | Novation ™ 1600 | 0.8 wt. % |
| C16-4 | Pre-gel Waxy Rice | National Starch | 0.48 wt. % |
| C16-5 | Modified Tapioca containing 18% by weight amylose | Textra ™ | 0.8 wt. % |
| C16-6 | Native Hybrid Waxy Potato Starch containing less than 1% by weight amylose | ELIANE ™ | 0.8 wt. % |
| C16-7 | Locust Bean Gum | GENU ® | 800 ppm |

Strain sweep measurements for each sample were then obtained using an ARES-LS1 rheometer, available from TA Instruments (New Castle, Del.). For a sample to exhibit good emulsion/suspension stability, the strain sweep would display a long linear range (no significant change in amplitude as a function of frequency) and a large plateau amplitude. Additionally, the strain sweep may identify undesirable sharp breaks in the plateau moduli which may indicate a gel like structure. The results of the strain sweep measurements of the samples are shown in FIG. 5.

Strain sweep measurements are obtained by recording dynamic modulus as a function of strain at 25° C. The linear range in this data corresponds to elastic modulus wherein change as a function of strain is insignificant. The line fit is performed to identify the plateau elastic modulus. The frequency of the measurement is 10 rad/s. The plateau elastic moduli from duplicate measurements were averaged. The results are shown in FIG. 5.

Figure 5:
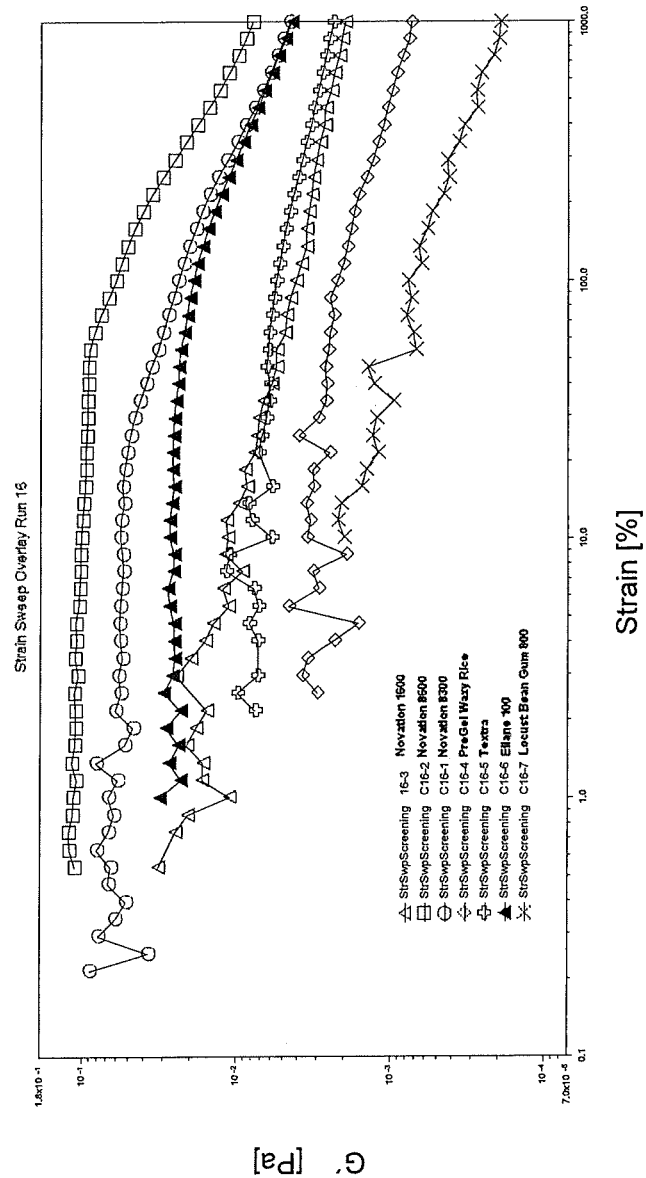
FIG. 5 is a graph depicting strain sweep measurements for various infant nutritional emulsions including starches as analyzed in Example 3.

As shown in FIG. 5, surprisingly the sample that exhibited good emulsion/suspension stability (i.e., no retrogradation) was the sample including the native hybrid waxy potato starch (C16-6). The other samples showed effects of gelling or no emulsion/suspension stability as indicated by sharp or short declines in strain sweep profiles (i.e., no linear range). This data indicates that the native hybrid waxy potato starch provides excellent stabilization properties.

Example 4

In this Example, liquid infant nutritional emulsions including varying starches were prepared and analyzed for emulsion/suspension stability.

Seven liquid infant nutritional emulsions were prepared using the starches as shown in the table below. The starches were added directly to 15 mL samples of a commercially available ready-to-drink liquid infant formula and the samples were then heated to a temperature of about 150° F. (65.6° C.) for a period of about 15 minutes. The samples were then subjected to a conventional retort processing process.

| Sample | Starch | Tradename | Amount of Starch in Emulsion Sample (% by wt) |
|---|---|---|---|
| C18-1 | Modified Potato including 21% by weight amylose | Novation ™ 1600 | 0.8 |
| C18-2 | Modified Waxy Rice | Novation ™ 8300 | 0.8 |
| C18-3 | Modified Waxy Rice | Novation ™ 8600 | 0.8 |
| C18-4 | Modified Tapioca containing 18% by weight amylose | Textra ™ | 0.8 |
| C18-5 | Native Hybrid Waxy Potato including less than 1% by weight amylose | ELIANE ™ | 0.8 |
| C18-6 | Modified Waxy Corn | Novation ™ 5600 | 0.8 |
| C18-7 | Waxy Corn | Amioca | 0.8 |

Strain sweep measurements for each sample were then obtained as described in Example 3. The results are shown in FIG. 6.

Figure 6:
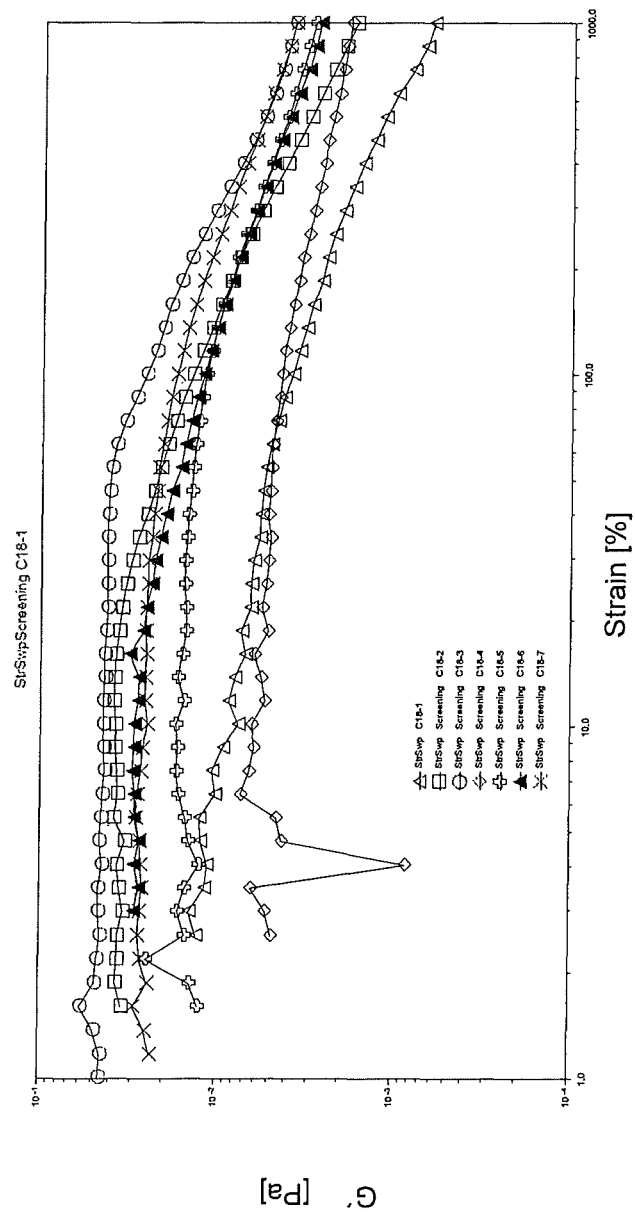
FIG. 6 is a graph depicting strain sweep measurements for various infant nutritional emulsions including starches as analyzed in Example 4.

As shown in FIG. 6, the two samples showing good product quality in strain sweep measurements were the samples including the waxy corn starch (Amioca) and the native hybrid waxy potato starch.

Further, the shear viscosity for each sample was measured using an ARES-LS1 rheometer, available from TA Instruments. The results are shown in the table below.

TABLE

| | Average viscosity of last 90 seconds | | |
|---|---|---|---|
| Sample | $0.5\ s^{-1}$ (rate) | $13\ s^{-1}$ (rate) | $100\ s^{-1}$ (rate) |
| | Viscosity mPa · s | | |
| C18-1 | 69.25 | 16.89 | 10.27 |
| C18-2 | 19.0504 | 15.2489 | 7.132 |
| C18-3 | 128.608 | 14.1504 | 7.364 |
| C18-4 | 6.4463 | 5.245 | 4.6638 |
| C18-5 | 8.6024 | 5.7256 | 5.3141 |
| C18-6 | 55.4791 | 9.9435 | 5.5662 |
| C18-7 | 11.401 | 8.1513 | 5.8096 |

As indicated by the shear viscosity measurements, there was more shear thinning in the sample including Amioca, which is typically seen with starch retrogradation, resulting in a creaming effect. Moreover, sample C18-5, including the native hybrid waxy potato starch, showed improved emulsion stability and suspension as compared to all other samples evaluated. This data shows that the native hybrid waxy potato starch provides excellent stabilization properties.

Example 5

In this Example, various processing conditions for adding a native hybrid waxy potato starch to infant nutritional emulsions were analyzed and evaluated to determine optimal processing conditions for the addition of the native hybrid waxy potato starch.

Six samples were prepared by adding a native hybrid waxy potato starch, either directly or after being hydrated and/or heated, to either Similac® Early Shield or Similac® Special Care 30 (both available from Abbott Nutrition, Columbus, Ohio). The six samples and their respective processing conditions are shown in the table below.

| Sample | Amount of Starch (% by weight) | Nutritional Emulsion | Point of Addition of Starch | Processing Conditions (temp of heat treatment, time period) |
|---|---|---|---|---|
| C24-1 | 0.8 | Similac ® Early Shield | Standardization Point, heated, and then sent to retort | 150° F., 30 min |
| C24-2 | 0.8 | Similac ® Early Shield | Standardization Point, heated, and then sent to retort | 160° F., 20 min |
| C24-3 | 0.8 | Similac ® Early Shield | Standardization Point, heated, and then sent to retort | 170° F., 10 min |
| C24-3 | 0.8 | Similac ® Early Shield | Prior to homogenization | Blended with protein-in-fat slurry |
| C24-8 | 0.8 | Similac ® Special Care 30 | Standardization Point, heated, and then sent to retort | 160° F., 20 min |
| C24-9 | 0.4 | Similac ® Special Care 30 | Prior to homogenization | Blended with carbohydrate, protein, and fat slurries |

Figure 7:
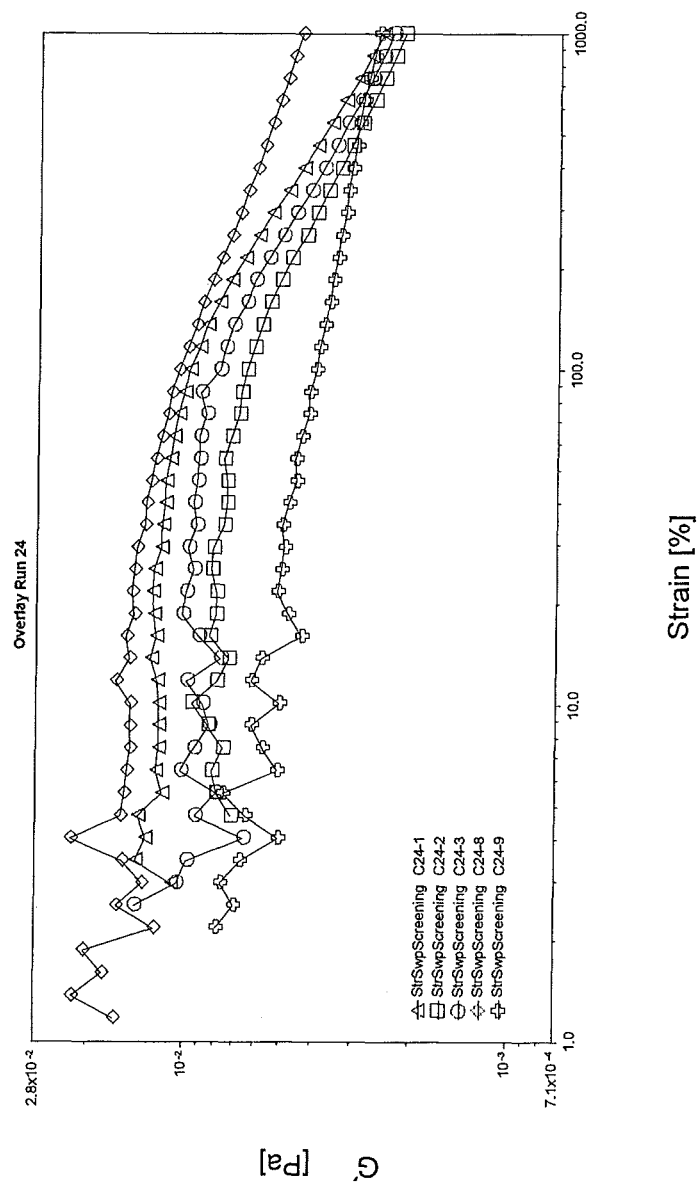
FIG. 7 depicting strain sweep measurements as obtained in Example 5.

As shown in FIG. 7, the optimal method of adding the native hybrid waxy potato starch into the liquid nutritional products is at the standardization point where the temperature was raised to about 150° F. for a period of about 30 minutes (Sample C24-1).

Example 6

In this Example, various infant nutritional emulsions were prepared with 0.8% by weight ELIANE™ food starch, added at standardization directly into cold formulations and heated to 150° F. for a period of 30 minutes prior to retort. The samples were compared, using strain sweep measurements, to the same infant nutritional emulsions including carrageenan as the stabilizer.

Figure 8:
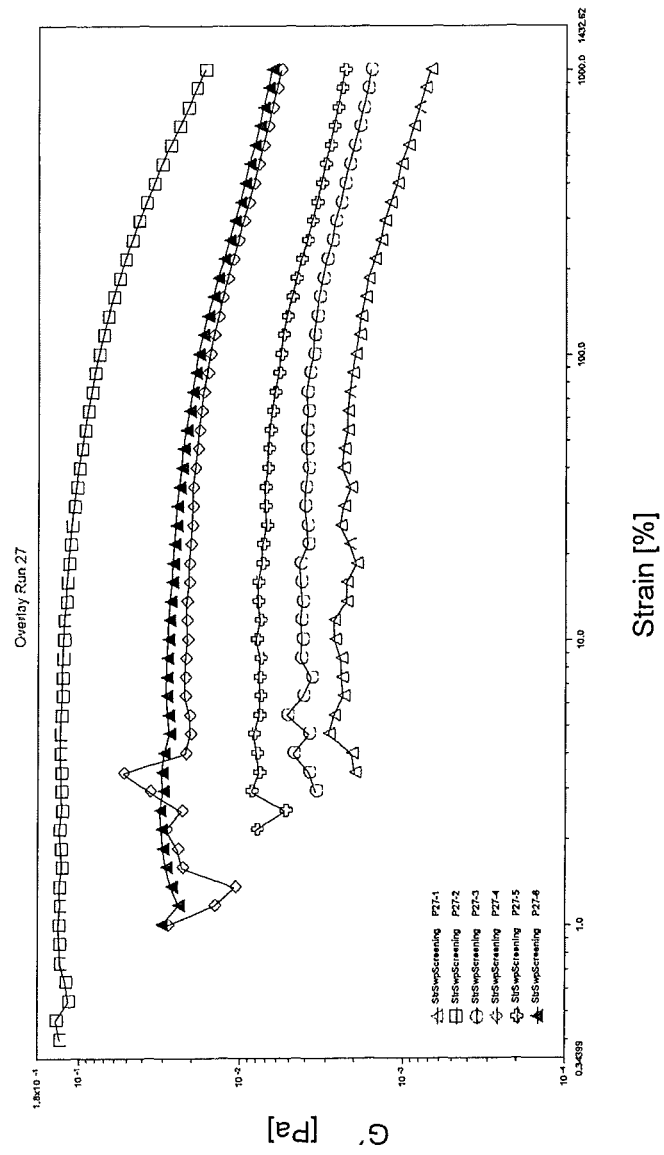
FIG. 8 is a graph depicting strain sweep measurements for infant nutritional emulsions including ELIANE™ food starch as analyzed in Example 6.
Figure 9A:
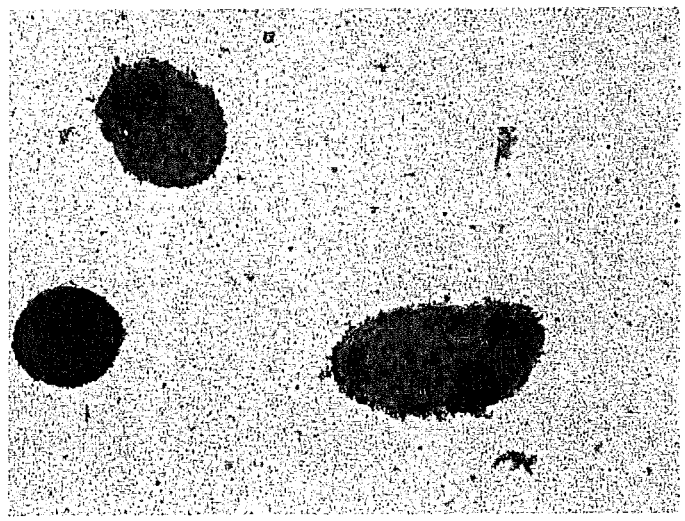
FIGS. 9A-9G are light microscopy photographs of various starches upon being gelatinized as analyzed in Example 7.
Figure 9B:
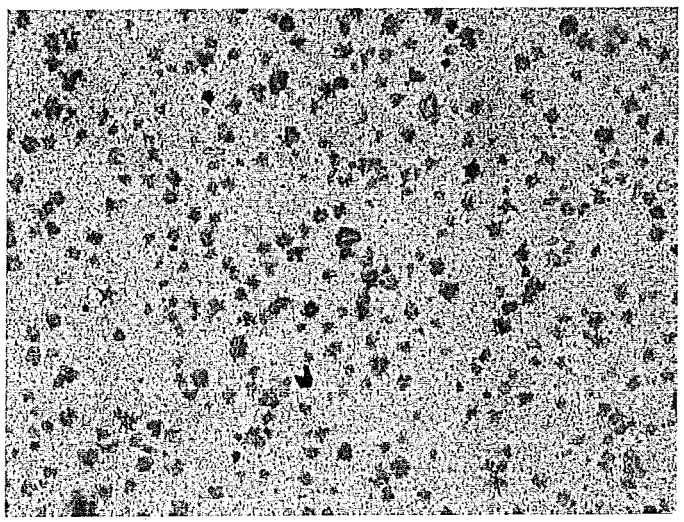
Figure 9C:
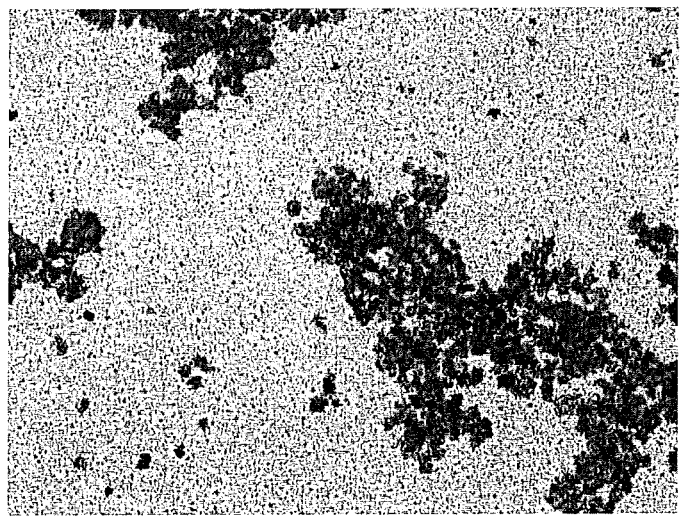
Figure 9D:
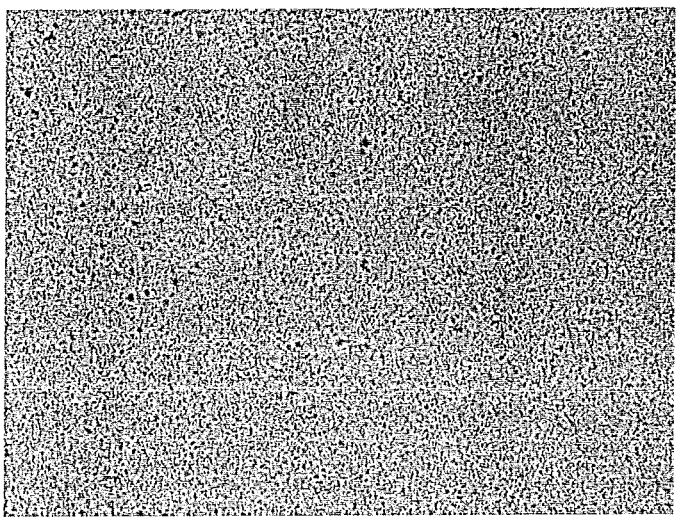
Figure 9E:
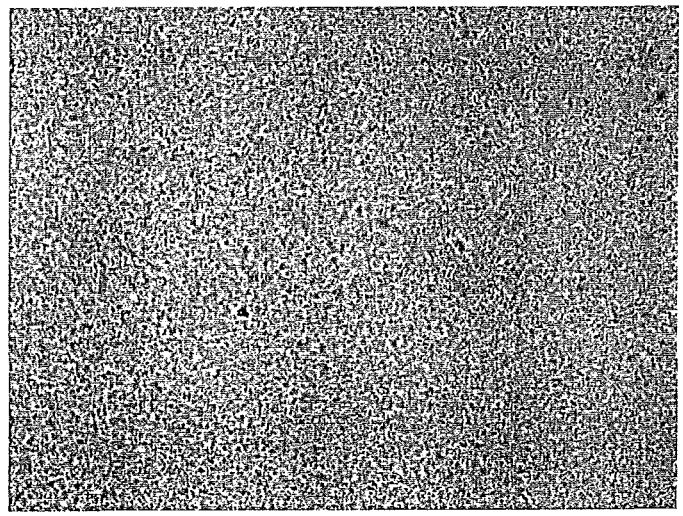
Figure 9F:
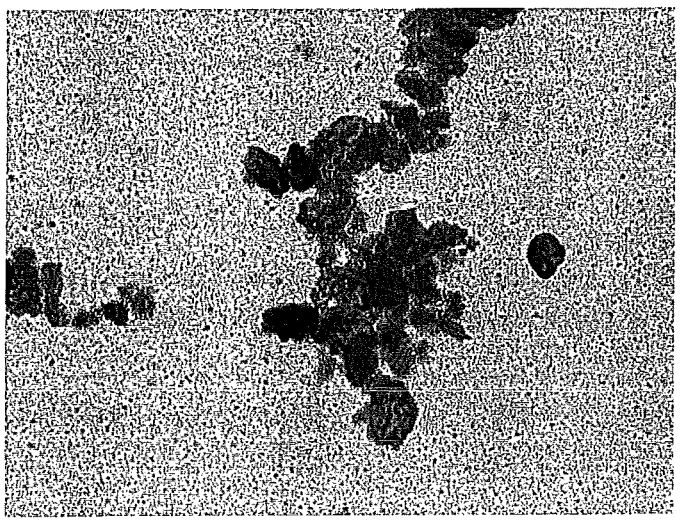
Figure 9G:
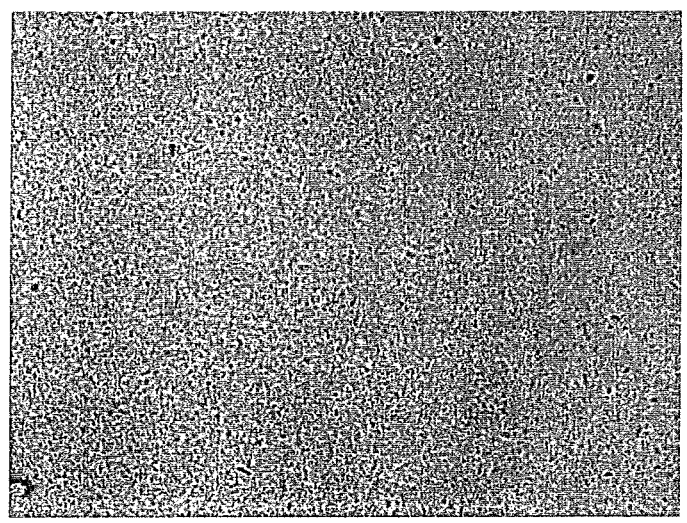

The samples tested are shown in the table below. Strain sweep measurements for each sample were obtained as described in Example 3. The results of the strain sweep test for the ELAINE™ food starch-containing formulas are shown in FIG. 8. Results of the carrageenan-containing formulas are not shown. As shown in FIG. 8, all of the samples including ELIANE™ food starch exhibited good strain sweep profiles, indicating improved emulsion/suspension stability. Unexpectedly, a trend was observed that 0.8% by weight starch addition level provided elevated stability at elevated caloric emulsions. Furthermore, Similac® Special Care 20, although one of the lower calorie emulsions, showed the highest stability among the emulsions where, in the past, this emulsion has demonstrated to be one of the most difficult emulsions in terms of emulsion/suspension stability.

| Sample | Infant Nutritional Emulsion | ELIANE ™ food starch | Carrageenan |
| --- | --- | --- | --- |
| P27-1 | Similac ® Early Shield | 0.8% | — |
| P27-1 | Similac ® Early Shield | — | 300 ppm |
| P27-2 | Similac ® Special Care 20 | 0.8% | — |
| P27-2 | Similac ® Special Care 20 | — | 300 ppm |
| P27-3 | Neosure ® | 0.8% | — |
| P27-3 | Neosure ® | — | 80 ppm |
| P27-4 | Similac ® Special Care 24 | 0.8% | — |
| P27-4 | Similac ® Special Care 24 | — | 300 ppm |
| P27-5 | Similac ® Special Care 24HP | 0.8% | — |
| P27-5 | Similac ® Special Care 24HP | — | 80 ppm |
| P27-6 | Similac ® Special Care 30 | 0.8% | — |
| P27-6 | Similac ® Special Care 30 | — | 80 ppm |

Example 7

In this Example, infant nutritional emulsions including various starches were analyzed microscopically.

Seven samples were slurried. Starches (indicated in the table below), at a concentration of about 0.8% by weight of the total batch in 20 gallons of water, were added to the slurries at standardization and heated treated at 150° F. for a period of 15 minutes. The starch slurries were then added to a sterile infant nutritional emulsion at high shear and then filled into 8 oz. bottles and retorted. The various starches used in the samples are shown in the table below.

| Sample | Starch | Tradename |
| --- | --- | --- |
| C-1 | Modified potato | Novation ™ 1600 |
| C-2 | Modified waxy rice | Novation ™ 8300 |
| C-3 | Modified waxy rice | Novation ™ 8600 |
| C-4 | Modified tapioca | Textra ™ |
| C-5 | Native hybrid waxy potato | ELIANE ™ 100 |
| C-6 | Modified waxy corn | Novation ™ 5600 |
| C-7 | Waxy corn | Amioca ™ |

The samples were then observed visually. All samples were similar in color and all samples showed a "creamy ring" at the top of the mixture in the bottles. The sample with ELIANE™ (C-5) food starch, however, appeared to have the smallest amount of creamy ring. The sample with Novation™ 5600 (C-6) appeared to be the worst from a homogeneity standpoint; not only was the creamy ring the widest of all the samples, but a layer of small particles had separated out of the bottom inch of the sample.

The samples were then diluted (approximately 1:40) in a 3.7 mL vial with distilled water. The samples were stained with 0.1N iodine solution and evaluated by light microscopy at 200×. The results are shown in FIGS. 9A-9G.

As shown in FIGS. 9A-9G, samples C-5 and C-7 appeared to have no intact starch granules, and observation of the samples showed that the formula consisting of ELIANE™ 100 was the most homogenous of all samples.

Examples 8-12

Examples 8-12 illustrate nutritional emulsions of the present disclosure including native hybrid waxy potato starch, the ingredients of which are listed in the table below. All ingredient amounts are listed as kilogram per approximately 1000 kg batch of product, unless otherwise specified.

| Ingredient Name | Example 8 | Example 9 | Example 10 | Example 11 | Example 12 |
| --- | --- | --- | --- | --- | --- |
| Ingredient Water | 766.4 | 766.4 | 766.4 | 766.4 | 766.4 |
| Condensed Skim Milk | 120.71 | 120.71 | 120.71 | 120.71 | 120.71 |
| Corn Syrup Solids | 35.35 | 35.35 | 35.35 | 35.35 | 35.35 |
| Soybean Oil | 17.17 | 17.17 | 17.17 | 17.17 | 17.17 |
| Lactose | 2.26 | 2.26 | 2.26 | 2.26 | 2.26 |
| Native Hybrid Waxy Potato Starch | 8.0 | 10.3 | 14.0 | 5.0 | 15.4 |
| Coconut Oil | 11.14 | 11.14 | 11.14 | 11.14 | 11.14 |
| Whey Protein Concentrate | 10.04 | 10.04 | 10.04 | 10.04 | 10.04 |
| MCT Oil | 9.58 | 9.58 | 9.58 | 9.58 | 9.58 |
| Potassium Hydroxide | 4.32 | 4.32 | 4.32 | 4.32 | 4.32 |
| Ascorbic Acid | 696.0 g | 696.0 g | 696.0 g | 696.0 g | 696.0 g |
| Potassium Citrate | 494.4 g | 494.4 g | 494.4 g | 494.4 g | 494.4 g |
| Calcium Carbonate | 465.0 g | 465.0 g | 465.0 g | 465.0 g | 465.0 g |
| Lecithin | 403.0 g | 403.0 g | 403.0 g | 403.0 g | 403.0 g |
| Emulsifier | 403.0 g | 403.0 g | 403.0 g | 403.0 g | 403.0 g |
| ARA Oil | 392.7 g | 392.7 g | 392.7 g | 392.7 g | 392.7 g |

-continued

| Ingredient Name | Example 8 | Example 9 | Example 10 | Example 11 | Example 12 |
| --- | --- | --- | --- | --- | --- |
| Ultramicronized Tricalcium Phosphate | 376.0 g | 376.0 g | 376.0 g | 376.0 g | 376.0 g |
| Nucleotide/Choline Mix | 293.2 g | 293.2 g | 293.2 g | 293.2 g | 293.2 g |
| Vitamin/Mineral Mix | 254.1 g | 254.1 g | 254.1 g | 254.1 g | 254.1 g |
| DHA Oil | 243.4 g | 243.4 g | 243.4 g | 243.4 g | 243.4 g |
| Magnesium Chloride | 233.0 g | 233.0 g | 233.0 g | 233.0 g | 233.0 g |
| m-Inositol | 208.6 g | 208.6 g | 208.6 g | 208.6 g | 208.6 g |
| Choline Chloride | 74.0 g | 74.0 g | 74.0 g | 74.0 g | 74.0 g |
| Vitamin ADEK Premix | 64.5 g | 64.5 g | 64.5 g | 64.5 g | 64.5 g |
| Potassium Chloride | 63.0 g | 63.0 g | 63.0 g | 63.0 g | 63.0 g |
| Ferrous Sulfate | 53.2 g | 53.2 g | 53.2 g | 53.2 g | 53.2 g |
| L-Carnitine | 44.5 g | 44.5 g | 44.5 g | 44.5 g | 44.5 g |
| Beta-Carotene | 1.74 g | 1.74 g | 1.74 g | 1.74 g | 1.74 g |
| Vitamin A Palmitate | 948.0 mg | 948.0 mg | 948.0 mg | 948.0 mg | 948.0 mg |
| Riboflavin | 624.8 mg | 624.8 mg | 624.8 mg | 624.8 mg | 624.8 mg |
| Sodium Chloride | as needed | as needed | as needed | as needed | as needed |
| Potassium Phosphate | as needed | as needed | as needed | as needed | as needed |

Examples 13-17

Examples 13-17 illustrate nutritional emulsions of the present disclosure including waxy starch and maltotriose, the ingredients of which are listed in the table below. All ingredient amounts are listed as kilogram per approximately 1000 kg batch of product, unless otherwise specified.

| Ingredient Name | Example 13 | Example 14 | Example 15 | Example 16 | Example 17 |
| --- | --- | --- | --- | --- | --- |
| Ingredient Water | 761.4 | 761.65 | 761.15 | 761.9 | 760.9 |
| Condensed Skim Milk | 120.71 | 120.71 | 120.71 | 120.71 | 120.71 |
| Corn Syrup Solids | 35.35 | 35.35 | 35.35 | 35.35 | 35.35 |
| Soybean Oil | 17.17 | 17.17 | 17.17 | 17.17 | 17.17 |
| Lactose | 2.26 | 2.26 | 2.26 | 2.26 | 2.26 |
| Waxy Starch | 14.0 | 13.3 | 14.7 | 12.6 | 15.4 |
| Maltotriose | 5.0 | 4.75 | 5.25 | 4.5 | 5.5 |
| Coconut Oil | 11.14 | 11.14 | 11.14 | 11.14 | 11.14 |
| Whey Protein Concentrate | 10.04 | 10.04 | 10.04 | 10.04 | 10.04 |
| MCT Oil | 9.58 | 9.58 | 9.58 | 9.58 | 9.58 |
| Potassium Hydroxide | 4.32 | 4.32 | 4.32 | 4.32 | 4.32 |
| Ascorbic Acid | 696.0 g | 696.0 g | 696.0 g | 696.0 g | 696.0 g |
| Potassium Citrate | 494.4 g | 494.4 g | 494.4 g | 494.4 g | 494.4 g |
| Calcium Carbonate | 465.0 g | 465.0 g | 465.0 g | 465.0 g | 465.0 g |
| Lecithin | 403.0 g | 403.0 g | 403.0 g | 403.0 g | 403.0 g |
| Emulsifier | 403.0 g | 403.0 g | 403.0 g | 403.0 g | 403.0 g |
| ARA Oil | 392.7 g | 392.7 g | 392.7 g | 392.7 g | 392.7 g |
| Tricalcium Phosphate | 376.0 g | 376.0 g | 376.0 g | 376.0 g | 376.0 g |
| Nucleotide Premix | 293.2 g | 293.2 g | 293.2 g | 293.2 g | 293.2 g |
| Vitamin/Mineral Premix | 254.1 g | 254.1 g | 254.1 g | 254.1 g | 254.1 g |
| DHA Oil | 243.4 g | 243.4 g | 243.4 g | 243.4 g | 243.4 g |
| Magnesium Chloride | 233.0 g | 233.0 g | 233.0 g | 233.0 g | 233.0 g |
| m-Inositol | 208.6 g | 208.6 g | 208.6 g | 208.6 g | 208.6 g |
| Carrageenan | 80.0 g | 80.0 g | 0 | 0 | 0 |
| Choline Chloride | 74.0 g | 74.0 g | 74.0 g | 74.0 g | 74.0 g |
| Vitamin ADEK Premix | 64.5 g | 64.5 g | 64.5 g | 64.5 g | 64.5 g |
| Potassium Chloride | 63.0 g | 63.0 g | 63.0 g | 63.0 g | 63.0 g |
| Ferrous Sulfate | 53.2 g | 53.2 g | 53.2 g | 53.2 g | 53.2 g |
| L-Carnitine | 44.5 g | 44.5 g | 44.5 g | 44.5 g | 44.5 g |
| Beta-Carotene | 1.74 g | 1.74 g | 1.74 g | 1.74 g | 1.74 g |
| Vitamin A Palmitate | 948.0 mg | 948.0 mg | 948.0 mg | 948.0 mg | 948.0 mg |
| Riboflavin | 624.8 mg | 624.8 mg | 624.8 mg | 624.8 mg | 624.8 mg |
| Sodium Chloride | as needed | as needed | as needed | as needed | as needed |
| Potassium Phosphate | as needed | as needed | as needed | as needed | as needed |

What is claimed is:

1. A stabilized liquid nutritional composition comprising a stabilizer system, the stabilizer system comprising a native hybrid waxy potato starch and maltotriose; wherein the maltotriose is present in an amount of 0.01% to 15% by weight of the composition; and wherein the stabilizer system reduces retrogradation in the composition.

2. The stabilized liquid nutritional composition of claim 1, wherein the maltotriose is present in an amount of 0.45% to 15% by weight of the composition.

3. The stabilized liquid nutritional composition of claim 1, wherein the native hybrid waxy potato starch comprises less than 1% by weight amylose and less than 0.07% by weight protein.

4. The stabilized liquid nutritional composition of claim 1, wherein the native hybrid waxy potato starch is present in an amount of 0.5% to 2% by weight of the composition.

5. The stabilized liquid nutritional composition of claim 1, wherein the native hybrid waxy potato starch is present in an amount of 0.5% to 15% by weight of the composition.

6. The stabilized liquid nutritional composition of claim 1, wherein the composition is carrageenan-free or cellulose gum-free.

7. The stabilized liquid nutritional composition of claim 1, wherein the stabilizer system consists essentially of the native hybrid waxy potato starch and maltotriose.

8. The stabilized liquid nutritional composition of claim 1, further comprising a protein component, a fat component, and a carbohydrate component;
- wherein the protein component comprises skim milk and whey protein concentrate;
- wherein the fat component comprises soy oil, coconut oil, and medium chain triglyceride oil;
- wherein the carbohydrate component comprises corn syrup solids and lactose; and
- wherein the composition is an infant formula.

\* \* \* \* \*